3,845,122
METHOD OF PRODUCING PURE PERCHLOROMETHYLMERCAPTAN

Boris Zupancic, Ljubljana, Yugoslavia, assignor to LEK tovarna farmacevtskih in Kemicnih izdelkov, Ljubljana, Yugoslavia
No Drawing. Filed Apr. 6, 1973, Ser. No. 348,651
Claims priority, application Yugoslavia, Apr. 14, 1972, P 1,018/72
Int. Cl. C07c *145/00*
U.S. Cl. 260—543 H          4 Claims

ABSTRACT OF THE DISCLOSURE

When the mixture of perchloromethylmercaptan and sulfur chlorides obtained by chlorination of carbon disulfide is treated with an oxidizing agent capable of yielding oxygen in the presence of water, the sulfur chlorides in the mixture are preferentially destroyed so that purified perchloromethylmercaptan free from its oxidation products is readily obtained. Further purification and lightening of the color is possible by reaction with a small amount of methanol.

---

This invention relates to the production of perchloromethylmercaptan, and particularly to a method of recovering perchloromethylmercaptan substantially free from sulfur chlorides and from trichloromethanesulfonyl chloride.

Perchloromethylmercaptan is a valuable intermediate in the synthesis of pesticides, such as N-trichloromethylthiophthalamide and N - trichloromethylthiotetrahydrophthalamide. It is commonly produced by reacting carbon disulfide at temperatures below 30° C. with 1.8 to 4.0 equivalents of chlorine, whereby a mixture of the desired product with sulfur chlorides is formed. The purification of the reaction mixture may follow various paths.

Earlier methods relied upon hydrolysis of the sulfur chlorides by means of water or steam. Elementary sulfur is produced thereby and interferes with the further workup. It has also been proposed to remove low-boiling constituents of the reaction mixture by distillation up to 140° C. and to wash the residue with alternating hot and cold water. Chlorine (German Pat. No. 915,335), sulfur dioxide and sulfites (German Pat. No. 910,297), sulfur trioxide (U.S. Pat. No. 2,664,442), hydrochloric acid and chlorine (U.S. Pat. 2,647,143), hypochlorites and chlorates (German Pat. No. 915,335) have been proposed as purifying agents.

Many of the known processes cause the formation of sulfur which dissolves in the perchloromethylmercaptan and contaminates the same. Others tend to reduce the yield. None of the known purification processes can avoid an ultimate vacuum distillation, and no known process suitable for industrial practice can yield a product containing significantly more than 90% perchloromethylmercaptan.

It has now been found that the chlorination mixture of perchloromethylmercaptan and sulfur chlorides can be purified simply, thoroughly, and with excellent yields by use of oxidizing agents, specifically sources of available oxygen which preferentially destroy the sulfur chlorides in the presence of water.

It has been known that perchloromethylmercaptan is sensitive to oxidizing agents and is readily oxidized to trichloromethanesulfonyl chloride. Nitric acid has been known since 1873 to cause such oxidation, and hydrogen peroxide, peracetic acid, and urea-hydrogen peroxide adduct have more recently been found to have an analogous effect (J. Org. Chem. *26* [1961] 3506).

Quite surprisingly, perchloromethylmercaptan is not attacked by the oxidizing agents known to destroy it when sulfur chlorides are simultaneously present. These chlorides, such as sulfur monochloride and sulfur dichloride, are the main contaminants in the reaction mixtures obtained by chlorination of carbon disulfide, and are preferentially decomposed by the sources of available oxygen according to this invention, leaving behind an almost pure perchloromethylmercaptan. The decomposition products are largely volatile. Residual contaminants, not presently identified, are removed by further reaction with methanol.

Suitable sources of available oxygen for the process of the invention include hydrogen peroxide, nitric acid, the alkali metal permanganates, water soluble salts of percarbonic acid, peracetic acid and other per-acids soluble in water, adducts of hydrogen peroxide with organic compounds such as urea or sebacic acid, and the like. While the compounds mentioned are all operative, hydrogen peroxide and nitric acid offer substantial economic advantages at this time, and are preferred for this reason. They also yield oxygen at a uniform rate that can be controlled readily, and do not themselves produce contaminants.

The necessary amount of the oxygen source must be determined on the basis of analysis or by trial and error for each chlorination mixture. Maximum yields of purest perchloromethylmercaptan are achieved when the oxidizing agent is at least the stoichiometric equivalent of the sulfur chlorides present, the amount and composition of the latter varying according to the amount of chlorine reacted with carbon disulfide.

The obvious precautions are to be taken to avoid attack on the perchloromethylmercaptan by the oxygen source. Thus, the latter is added gradually and with agitation to avoid local excessive concentrations. Within the limits set by the available sulfur chlorides, the concentration of the oxygen source is not critical in itself. The temperature should be kept relatively low, that is, at or below 40° C., best results being usually achieved at about 20° C. The lower limit of the reaction is set by the freezing point of the aqueous phase necessarily present, that is, near 0° C. No sulfur is formed between 0° and 40° C.

Perchloromethylmercaptan is much heavier than water, and two separate layers form quickly when agitation of the oxidation mixture is discontinued. The purified compound may still contain trace amounts of coloring matter which is destroyed by addition of small amounts of methanol.

If so desired, low-boiling by-products and decomposition products may be removed by distillation at low temperature at various stages of the process, an upper temperature limit of 50° C. being advisable, and relatively high-boiling contaminants being removed at this temperature by the use of vacuum. Such a preliminary purification is applied preferably to the chlorination mixture prior to reaction with the oxygen source.

A product closely approaching the index of refraction of chemically pure perchloromethylmercaptan ($n_D^{20}$=1.5395) is readily obtained by the method of the invention under conditions of industrial production, and it may be pure enough to react with phthalimide in a known manner to produce a 99% yield of N-trichloromethylthiophthalimide. As much as 90% of the perchloromethylmercaptan present in the crude chlorination mixture may be recovered in the practically pure condition, and the pure product may be equivalent to 70% to 80% of the carbon disulfide originally chlorinated.

The oxygen sources are generally added to the chlorination mixture in the form of their aqueous solutions, thereby facilitating reaction control.

The following Examples are further illustrative of this invention.

EXAMPLE 1

A mixture of perchloromethylmercaptan and sulfur chlorides was prepared by introducing chlorine gas into carbon disulfide until about 2.5 to 2.7 moles chlorine were absorbed per mole of carbon disulfide. The mixture was then gradually heated to 50° C. in a partial vacuum of 100 torr whereby about 15%–20% of the mixture was volatilized. The liquid residue was brown, and it had an index of refraction $n_D^{20}$ of 1.5392 to 1.5430 depending on minor changes in process conditions.

When a portion of this crude product having an index $n_D^{20}=1.5397$ was reacted with phthalimide, N-trichloromethylthiophthalimide was obtained in a yield of only 64%. The product melted at 164°–167° C., and a fraction amounting to about 10% had a melting point above 185° C., indicating that the brown liquid was quite impure.

Another portion of the brown distillation residue (500 g.) was mixed with vigorous agitation with 0.32 g. isotridecyl alcohol which had been ethoxylated with 8 moles ethylene oxide, the mixture was cooled to about 5° to 10° C., and HCl and SO$_2$ were removed by the suction of a vacuum pump.

140 g. 30% Hydrogen peroxide was added dropwise to the residual mixture with stirring at such a rate that the temperature did not exceed 20° C. The color of the mixture gradually changed from brown to orange to light yellow. The hydrogen peroxide addition was completed after 40 minutes, but stirring was continued 20 minutes longer. Thereafter, two cleanly defined layers formed, and the non-aqueous layer was found to consist of purified perchloromethylmercaptan of $n_D^{20}=1.5408$ and containing 75.5% chlorine (calculated: 76.2%). When diluted with heptane, the liquid remained transparent, indicating the absence of trichloromethanesulfonyl chloride which is insoluble in heptane. The purified perchloromethylmercaptan reacted with phthalimide to produce N-trichloromethylthiophthalimide in a yield of 92.8%.

EXAMPLE 2

Yet another 500 g. portion of the brown distillation residue described in Example 1, was purified by hydrogen peroxide treatment as in the preceding Example, and the non-aqueous layer consisted of 439.78 g. purified, light yellow perchloromethylmercaptan having an index $$n_D^{20}=1.5418.$$

The purified product was held at 10° C. while 8.8 ml. methanol was added dropwise over a period of a few minutes with agitation. After 15 minutes stirring at ambient pressure, stirring was continued for 15 minutes in the vacuum of a water jet pump. The mixture was permitted to separate into two layers, and the further purified perchloromethylmercaptan was recovered in an amount of 432.03 g., was straw-colored, had an index $n_D^{20}=1.5401$, and was found to contain 75.90% chlorine. It could be diluted with heptane without causing turbidity, and reacted with phthalimide in the same manner described above with a yield of 97.3%.

EXAMPLE 3

A further 2000 g. portion of the brown distillation residue produced as in Example 1 was treated with isotridecyl alcohol and further exposed to a partial vacuum as in Example 1. While the liquid was held at 15° to 20° C., 560 g. 30% hydrogen peroxide was added dropwise over a period of 88 minutes with stirring. Stirring was continued for seven more minutes, and the mixturue was permitted to separate into two phases. 1840.5 g. Purified, light yellow perchloromethylmercaptan of $n_D^{20}=1.5393$ was obtained.

It was further purified by vigorous agitation at 10°–15° C. while 35.2 ml. methanol was added gradually, and agitation was continued for 15 minutes at ambient pressure and for 15 minutes in the vacuum of a water jet pump, whereupon two layers were permitted to separate.

One layer weighed 1805.5 g., and its weight was reduced to 1745 g. by drying over calcium chloride. The dried product was straw colored and had an index $$n_D^{20}=1.5391.$$

It remained transparent when diluted with heptane and reacted with phthalimide at a yield of 96.4%.

EXAMPLE 4

Another 500 g. batch of the brown reaction mixture of Example 1 was treated with isotridecyl alcohol and vacuum as in Example 1. Thereafter 157 g. 33% nitric acid was added dropwise over a period of 40 minutes with stirring, and stirring was continued thereafter for 20 minutes. The two layers separated by settling were recovered, and the non-aqueous layer consisted of 414.8 g. purified, red, perchloromethylmercaptan of $n_D^{20}=1.5389$. It was held at 10°–15° C. while 8.8 ml. methanol was added with vigorous stirring over a period of 1–2 minutes. Upon further stirring, the color changed from red to straw yellow, and stirring was continued in a vacuum of a water jet pump for 15 minutes.

The straw yellow product so obtained weighed 406.7 g. and had a refractive index $n_D^{20}=1.5386$. It remained transparent upon dilution with heptane and reacted with phthalimide to produce a condensation product melting at 176°–177° C. at 99.7% yield.

EXAMPLE 5

The starting material was a distillation residue produced as in Example 1 and having an index of $$n_D^{20}=1.5388.$$

500 g. residue was treated with isotridecyl alcohol and in a vacuum as in Example 1 whereupon 157 g. 33% nitric acid was added dropwise at a high rate so that the temperature rose to 30°–35° C. while the mixture was cooled externally with ice and water. Stirring was continued for 20 minutes after the last acid had been added, and the aqueous layer was removed thereafter.

384.0 g. purified, orange-colored perchloromethylmercaptan of $n_D^{20}=1.5391$ was obtained, which was further purified by stirring with 8.8 ml. methanol at 10°–15° C. as described above. The further purified product weighed 379.7 g., was straw colored, and had an index of refraction $n_D^{20}=1.5388$. It showed only slight turbidity when diluted with heptane, and reacted with phthalimide to produce a condensate melting at 170°–173° C. in a yield of 96.5%.

EXAMPLE 6

The general procedure of Example 5 was repeated, but the nitric acid employed had a concentration of 49% and weighed 106 g. The oxidation was performed at 20°–25° C. The first purified material was orange colored, weighed 406.2 g., and had an index $n_D^{20}=1.5398$. Upon further purification with methanol, the product changed to a straw yellow color and $n_D^{20}=1.5399$. It weighed 398.7 g. and remained clear when diluted with heptane. Condensation with phthalimide showed a 97.5% yield of a product melting at 175°–179° C.

What is claimed is:

1. In a method of producing perchloromethylmercaptan in which carbon disulfide is reacted with chlorine until a mixture of said perchloromethylmercaptan with sulfur chlorides is formed, and said sulfur chlorides are separated from said perchloromethylmercaptan, the improvement which comprises holding said mixture in contact with a source of available oxygen selected from the group consisting of hydrogen peroxide, nitric acids, salts of permanganic acid and percarbonic acid, of peracids, and adducts of hydrogen peroxide with urea and sebacic acid in the presence of water at a temperature between 0° C. and 40° C. until said sulfur chlorides are substantially consumed by reaction with the oxygen of said source, and recovering the perchloromethylmercaptan purified thereby.

2. The method of claim 1 wherein said mixture is agitated with ethoxylated isotridecyl alcohol prior to contacting with said source of available oxygen.

3. In a method as set forth in claim 1, said purified recovered perchloromethylmercaptan being further purified by holding the same in contact with methanol.

4. In a method as set forth in claim 1, said mixture prior to said holding in contact with said source being subjected to distillation at a temperature not exceeding 50° C. at a pressure lower than atmospheric for removal of volatile impurities.

References Cited

UNITED STATES PATENTS

| 2,545,285 | 3/1951 | Kamlet | 260—543 H |
| 2,664,442 | 12/1953 | Kamlet | 260—543 H |
| 2,759,969 | 8/1956 | Jonas | 260—543 H |

FOREIGN PATENTS

| 915,335 | 7/1954 | West Germany | 260—543 H |

LORRAINE A. WEINBERGER, Primary Examiner

R. D. KELLY, Assistant Examiner